United States Patent [19]
Wen

[11] Patent Number: 6,109,745
[45] Date of Patent: Aug. 29, 2000

[54] BORDERLESS INK JET PRINTING ON RECEIVERS

[75] Inventor: Xin Wen, Rochester, N.Y.

[73] Assignee: Eastman Kodak Company, Rochester, N.Y.

[21] Appl. No.: 09/118,538

[22] Filed: Jul. 17, 1998

[51] Int. Cl.[7] ........................................ B41J 2/01
[52] U.S. Cl. ................... 347/101; 347/5; 347/16; 347/105; 400/61; 400/62; 400/621
[58] Field of Search ..................... 347/101, 103, 347/104, 105, 106, 5, 37, 20, 16, 43; 400/61, 62, 621

[56] References Cited

U.S. PATENT DOCUMENTS

| 5,598,196 | 1/1997 | Braun | 347/68 |
| 5,992,973 | 10/1999 | Wen | 347/43 |

FOREIGN PATENT DOCUMENTS 771 657 A2  10/1996  European Pat. Off. .

*Primary Examiner*—John S. Hilten
*Assistant Examiner*—Minh Chau
*Attorney, Agent, or Firm*—Raymond L. Owens

[57] ABSTRACT

Ink jet printing apparatus for forming a borderless image on a receiver in response to a digital image file having a digital image and the desired size of the image to be formed, including an ink jet print bar for delivering ink to the receiver and disposed at an image transfer position. The apparatus moves the receiver along a path onto a platen past the ink jet print bar at the image transfer position; a receiver detector unit disposed adjacent to the path for detecting the leading edge of the receiver prior to its moving to the image transfer position; a receiver cutter for cutting the receiver to an appropriate size; and control circuitry responsive to the digital image file for determining the appropriate size of the borderless image on the receiver and for actuating the ink jet printer to cause an ink image to be formed on the receiver as it moves past the image transfer position and for actuating the receiver cutter to cut the receiver so a borderless image is formed on the receiver.

15 Claims, 4 Drawing Sheets

BORDERLESS INK JET PRINTING ON RECEIVERS

FIELD OF THE INVENTION

The present invention relates to providing borderless ink images on receivers.

BACKGROUND OF THE INVENTION

Photographic print produced by silver halide chemistry has been a popular means for people to share memories and experiences. These photographic prints are produced by optical exposures on photographic receiver coated with sensitized materials. Photographic prints are of high quality, low cost, and easy to use. These attributes have largely been responsible for the success of photography in the last 100 years. One feature proven to be very desirable to photographic viewers is so called borderless print. Borderless print refers to photographic images that are printed from edge to edge on a photographic receiver.

In recent years, great advancement has been realized in digital printing technologies. These printing techniques have the advantages of easy image manipulation, compatibility with digital image files, and potential faster turn-around time. But these printing technologies have been mainly designed for producing documents. Digital printers are not compatible with borderless printing. The receiver borders in many of the ink jet printers are not printable because the receiver borders are held by mechanical components for receiver holding.

SUMMARY OF THE INVENTION

An object of this invention is to provide borderless ink images on receivers.

Another object is to provide borderless ink images on receivers that simulate the "look and feel" of a traditional photograph produced by photosensitive materials.

These objects are achieved by ink jet printing apparatus for forming a borderless image on a receiver in response to a digital image file having a digital image and the desired size of the image to be formed, comprising:

a) ink jet print means for delivering ink to the receiver and disposed at an image transfer position;

b) means for moving the receiver along a path onto a platen past the ink jet print means at the image transfer position;

c) detector means disposed adjacent to the path for detecting the leading edge of the receiver prior to its moving to the image transfer position;

d) a receiver cutter for cutting the receiver to an appropriate size; and e) control means responsive to the digital image file for determining the appropriate size of the borderless image on the receiver and for actuating the ink jet printer to cause an ink image to be formed on the receiver as it moves past the image transfer position and for actuating the receiver cutter to cut the receiver so a borderless image is formed on the receiver.

ADVANTAGES

An advantage of this invention is that borderless ink images can be produced on a receiver.

A feature of this invention is that ink image sizes can be varied according to the receiver dimensions to enable borderless printing. Borderless printing for many users provides the "look and feel" of a traditional photograph produced by photosensitive materials.

Another feature of this invention is that a receiver cutter can be used to cut the appropriate size of the receiver so that a borderless print is produced.

DETAILED DESCRIPTION OF THE INVENTION

The present invention is described with relation to a digital printing apparatus for providing borderless ink images on a receiver.

Figure 1:
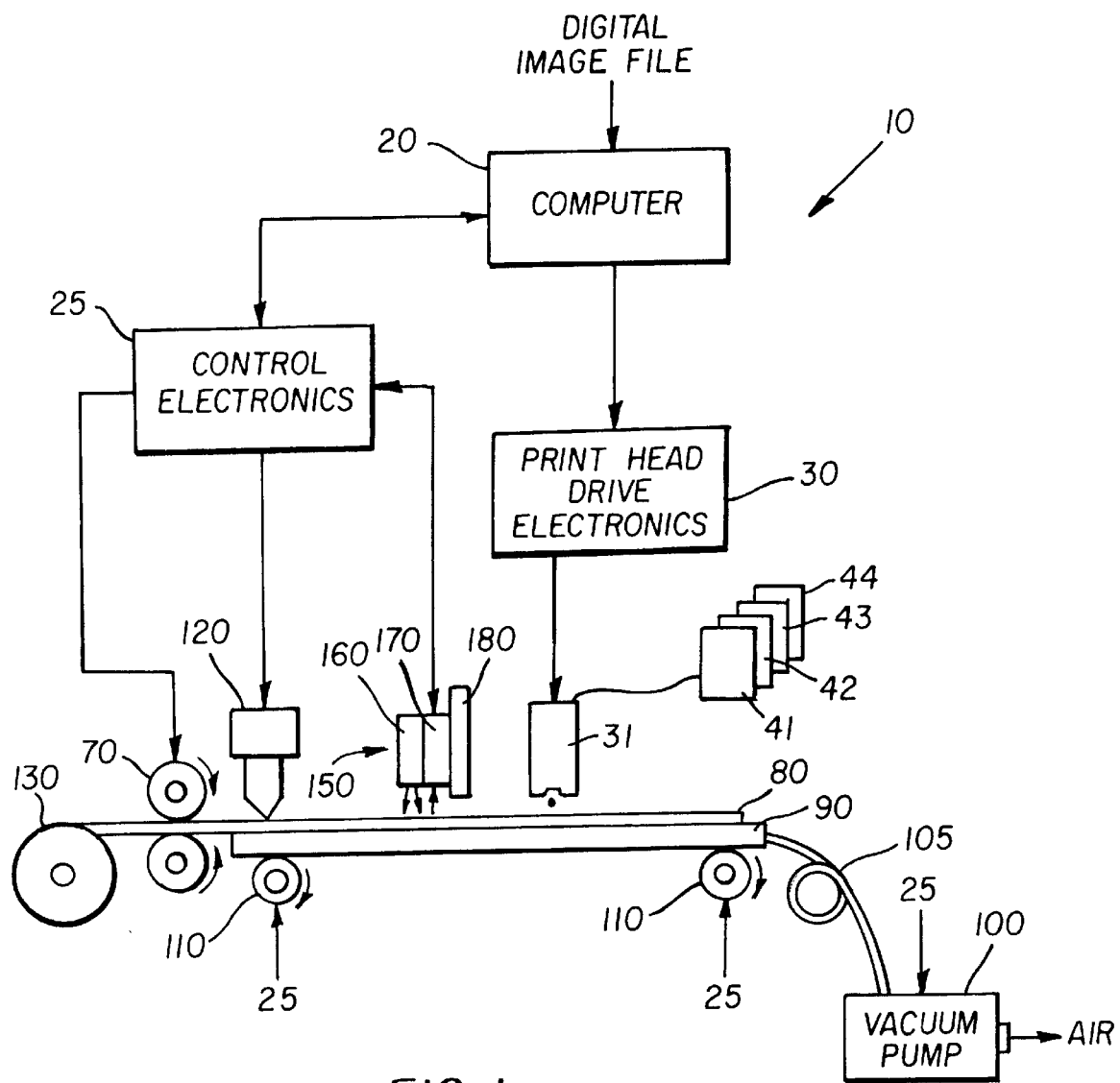
FIG. 1 is a schematic front view of the ink jet printing apparatus in accordance with the present invention.
Figure 2:
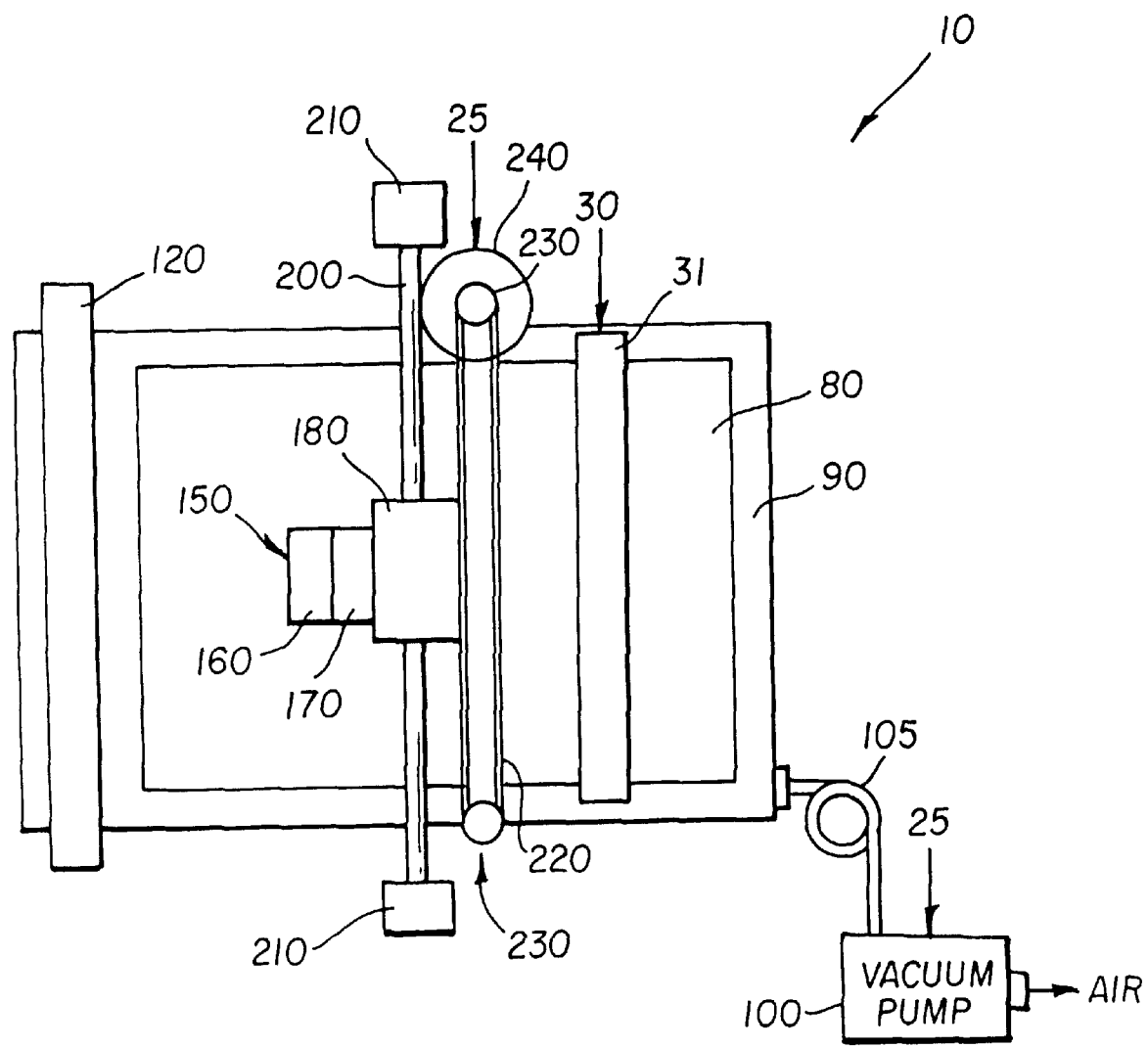
FIG. 2 is a partial top view of the ink jet printing apparatus of FIG. 1.

Referring to FIGS. 1 and 2, an ink jet printing apparatus 10 is shown to comprise a computer 20, control electronics 25, print head drive electronics 30, ink jet print bar 31, a plurality of ink reservoirs 40–43 for providing the inks to the ink jet print bar 31. The ink jet print bar is disposed at an image transfer position. The ink jet printing apparatus 10 further includes a receiver transport mechanism 70 for transporting a receiver 80 over a platen 90 under the print bar 31 at the image transfer position. The receiver 80 is held to the platen 90 by vacuum suction by a vacuum pump 100 via a vacuum tube 105 in response to the control electronics 25. Preferably, no mechanical components are used to hold on the ink receiving side of the receiver 80. This permits the ink jet print bar 31 to print freely across the whole receiver 80 from edge to edge. The platen 90 can be transported by platen transport device 110. The platen transport device 110 and the receiver transport mechanism 70 are both controlled by control electronics 25. The ink jet print bar 31 includes a plurality of ink nozzles and associated ink drop activators for delivering different colored ink drops to the receiver 80. Preferably, the length of ink jet print bar 31 is across the whole width of the receiver 80. The ink jet print bar 31 can be provided by an assembly of ink jet print heads or by linear arrays of ink nozzles on a monolithic nozzle plate and associated fluidic structure for each color ink. For the ink jet print bar 31 narrower than the width of the receiver 80, the ink image is composed of a plurality of printing swaths with each swath printed by one printing pass of the ink jet print bar. The ink drops can be ejected from the ink nozzles by the ink jet activation means well known in the art, for example, piezoelectric or thermal ink jet print head structures. Examples of ink jet print heads are shown in commonly assigned U.S. Pat. No. 5,598,196 and European Patent 771 657 A2.

Still referring to FIGS. 1 and 2, an ink jet printing apparatus 10 also includes a receiver cutter 120. The cutting operation of the receiver cutter 120 is controlled by control electronics 25. The receiver can be cut before printing, as shown in FIGS. 1 and 2, or after printing to enable printing borderless ink image on the receiver 80. The receiver 80 can be provided by a web fed by receiver roll 130 which includes a wound web. In the instance where a web is used as the receiver it, of course, must be cut to size by the receiver cutter 120. Or alternatively, the receiver 80 can also be fed as cut sheet onto the platen 90 by receiver transport mechanism 70. Although flatbed platen 90 is shown in FIG. 1, it is understood that many other platen types are also compatible with the present invention. For example, a belt or a drum transport can be used for moving the receiver 80 under the ink jet print bar 31. Also connected to the control electronics 25 is a receiver detection unit 150 including a light source 160 and an optical sensor 170. The receiver detection unit 150, as will be later described, not only detects the lead edge of a receiver, but also can detect receiver dimensions such as receiver length and width. The light source can be a Light Emitting Diode, a diode laser, or a fluorescent lamp. The optical sensor 170 can be a photodiode or a two dimensional CMOS or CCD imager. The receiver detection unit 150 is bi-directional communication with the control electronics 25 for receiving commands for receiver position detection and for sending position information to the control electronics 25. The detection unit 150 is attached to a holder 190 that is mounted on a sliding rail 200. The sliding rail 200 is supported by supports 210. The holder 190 and therefore the receiver detection unit 150 can be translated by a belt 220, a pulley mechanism 230 and motor 240 along the sliding rail 200. The motor 240 can be a DC motor. Although not shown, the transport for the receiver detection unit can further include positional feedback loop and a linear encoder.

Referring also to FIGS. 3a–c and FIG. 4, a borderless printing operation includes the following procedure. A digital image file is input to or produced in the computer 20. The digital image file includes a digital image and information associated with the digital image. The information includes dimensions of the digital image in the number of image pixels, desired printing resolution, desired image format such as 3R, 4R, panorama, etc., desired optical densities and tone scale, time, location and annotation regarding to the digital image. A receiver 80 is loaded by receiver transport mechanism 70 on to platen 90 in block 400 of FIG. 4 while the receiver detection unit 150 is positioned at the center of the sliding rail 200. The receiver can be fed as cut sheet, or in a web as shown in FIG. 1. The cut sheets can be in standard format such as 3R, 4R, panoramic, or HDTV. In some cases, the receiver size is the same as what is defined in the input digital image file. In other cases, for example, when enlargement is to be made, the receiver size can be different from that indicated in the input digital image file. The light emitted by light source 160 is reflected from the platen surface and is continuously monitored by the optical detector 170. As the lead edge 300 of the receiver 80 passes the receiver detection unit 150, the optical detector 170 detects a change in the reflective optical intensity between the light reflected from the platen surface and the receiver surface (block 410). The location of the lead edge 300 of the receiver 80 is recorded. As the receiver lead edge 300 moves passing the receiver detection unit 150, the receiver travel distance is also recorded. After the lead edge 300 of the receiver 80 passes the receiver detection unit by predetermined length (typically a quarter of the image length), the receiver 80 is stopped. The receiver detection unit 150 is scanned in block 420 across the width dimension of the receiver 80 by motor 240, belt 220 and pulley mechanism 230 under the control of control electronics 25. The side edges 310 of the receiver 80 are detected by the receiver detection unit 150. The locations of the side edges 310 are sent to the control electronics 25 and recorded on the computer 20. Typically, the steps of blocks 410 and 420 are repeated so that several locations are measured and recorded along each of the lead edge and side edges. For a cut-sheet receiver, the locations on the rear edge 320 of the receiver 80 are also measured.

Next, in block 430, the computer 20 calculates the boundaries along the lead edge 300 and the side edges 310 of the receiver 80. Typically, the receiver 80 has straight edges and the boundaries of the receiver 80 can be obtained by fitting the measured edge locations using the function for a straight line. Thus the orientations of each of receiver edges are obtained. The side edges 310 of the receiver 80 are commonly parallel to each other. In the normal printing mode, the side edges of the receiver 80 should also be parallel to the receiver transport direction. Any deviation of the side edges 310 from this direction is defined as receiver skew. A question is therefore asked in block 440 whether the skew of the receiver 80 is within tolerance or not? If the answer is No, the receiver 80 is realigned in block 450. The operator of the ink jet printing apparatus 10 first shuts off the vacuum to permit receiver 80 to be freely moved on the platen 90. The receiver can also be unwound by the receiver transport mechanism 70 and realigned during loading. The operations in blocks 400 through 440 are repeated.

If the answer to the question in block 440 is Yes, the width (and length for a cut sheet) of the receiver 80 is calculated by computer 20. The user is asked in block 500 whether a borderless printing is required? If the answer is No to the question in Block 500, the user inputs the orientation of the image in block 510 by selecting portrait or landscape. The user then inputs the size of the image in block 520 with the requirement that the image dimensions to be smaller than the corresponding receiver dimensions along each direction. The user then inputs the location of the image in block 530 relative to the lead edge 300 and side edges 310 of the receiver 80. The image can be located in the center or justified with a fixed border width to an edge of the receiver 80. The input digital image is next resized in block 540 to the required image size according to the resolution of the image to be printed. In addition to the image resizing, the digital image can also be processed in the computer 20 by other image processing operations well known in the art such as tone scale conversion, color mapping, and halftoning. Next in block 550, the start positions (the first print line) is calculated and recorded. The image is finally printed in block 800.

Figure 3A:
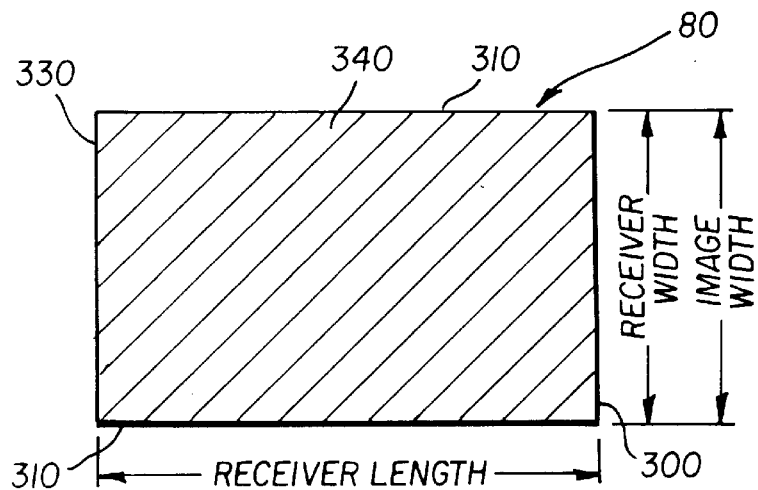
FIGS. 3a–c are schematic views of relative dimensions of the ink receiver and the resized images.
Figure 3B:
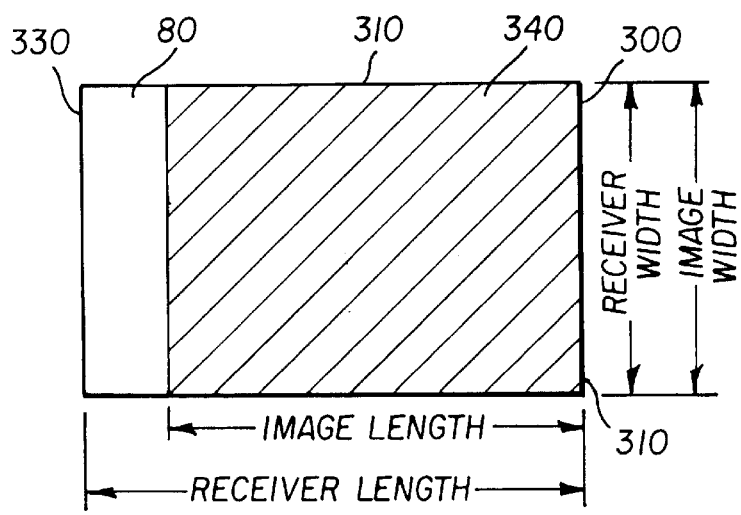
Figure 3C:
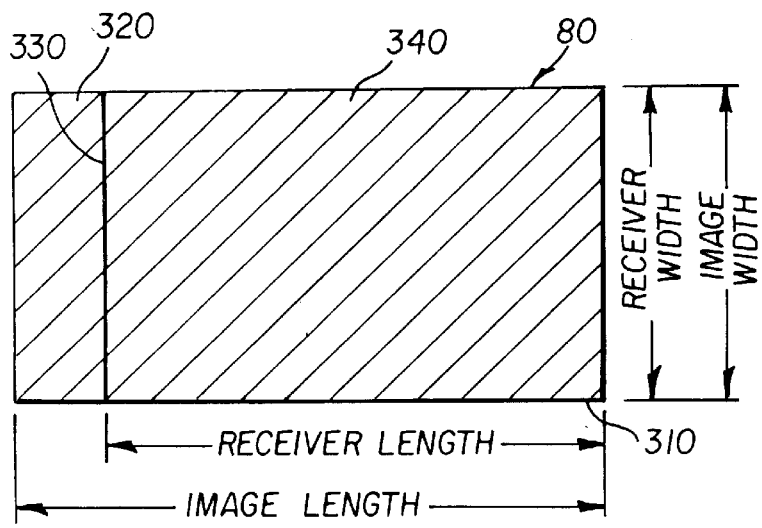
Figure 4:
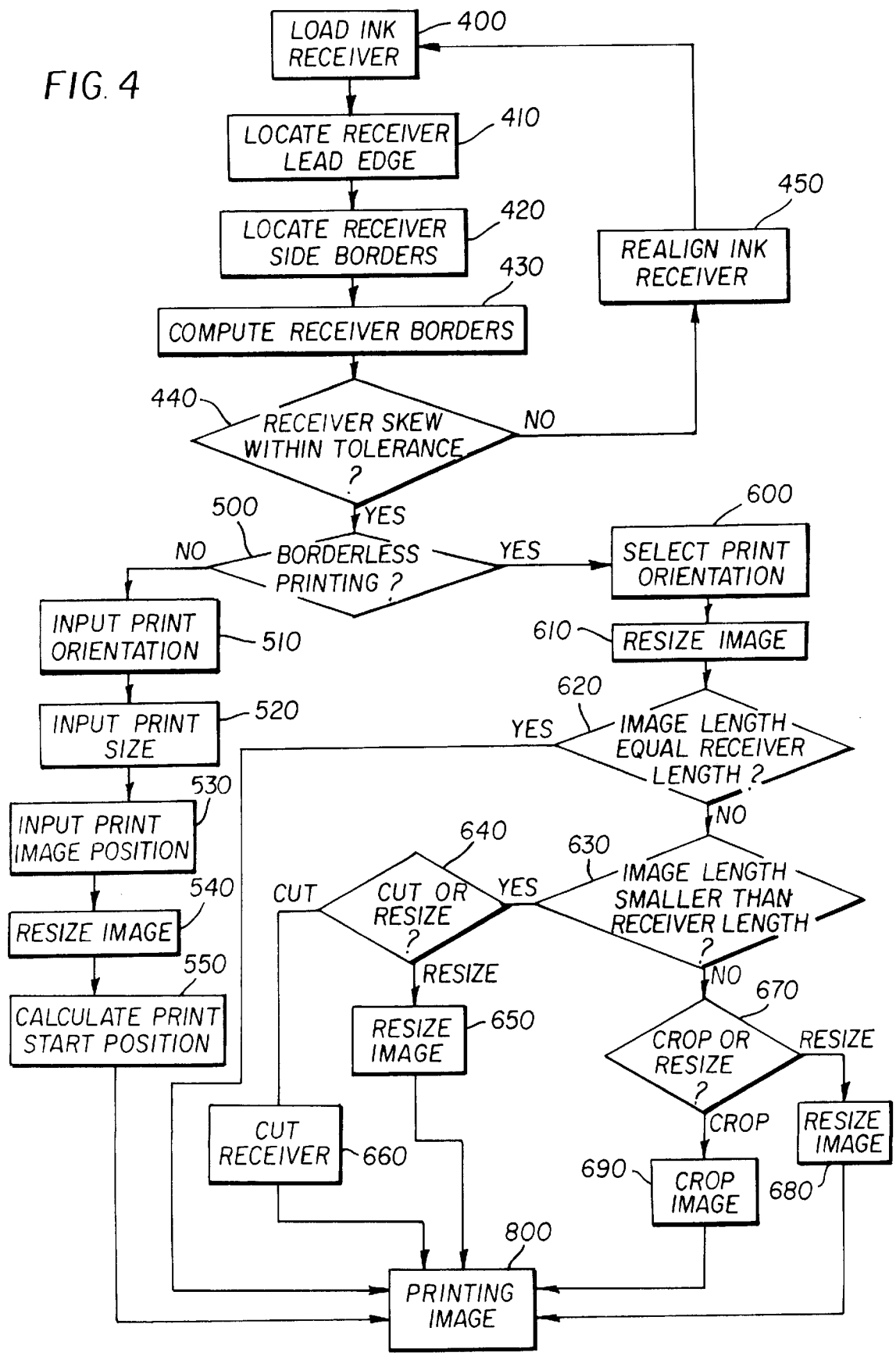
FIG. 4 is the flow chart of operations for borderless printing in accordance with the present invention.

If the answer is Yes to the question in Block 500 (borderless printing is selected), the user selects the orientation (portrait vs. landscape) of the image in block 600. Using the calculated receiver width, the input digital image is resized in block 610 so that the width of the resized image 340 matches the width of the receiver 80 (FIGS. 3a–c). The resizing of image conserves the aspect ratio (i.e. the width to length ratio) of the input digital image. Preferably, the width of the resized image 340 is a couple of print lines wider than the width of the receiver 80 to assure no areas or spots are left unprinted along the edges of the receiver 80. The digital image is also processed in the computer 20 by other image processing operations such as tone scale conversion, color mapping, and halftoning. A question is then asked in block 620 whether the length of the resized image is the same as the receiver length? If the answer is Yes, an borderless image is printed in block 800. This scenario, shown in FIG. 3a, is typical for a standard input image format (e.g. 4R) and a compatible load receiver format (also 4R). In digital photo labs, a batch of digital images of the same format can be printed as borderless images before the format is changed to a different format.

If the answer to the question in block 620 is NO, a following question is asked in block 630 on whether the length of the resized image is smaller than the receiver length? If the answer is YES, the resized image 340 is shorter than the receiver 80. The relative dimensions of the resized image 340 and the receiver 80 are shown in FIG. 3*b*. A question is asked in block 640 whether the user wants to resize the image again without preserving the aspect ratio of the original digital image to fit the receiver dimensions, or the user wants to cut the receiver 80? If answer to block 640 is RESIZE, the resized image 340 is resized again in block 650 so that the width and the length of the final image are both equal to those of the receiver 80. If the answer to block 640 is CUT, the receiver 80 is cut at the appropriate length location by cutter 120 under the control of control electronics 25. A borderless image is then printed.

If the answer to the question in block 630 is NO, the resized image 340 is longer than the receiver 80. The relative dimensions of the resized image 340 and the receiver 80 are shown in FIG. 3*c*. A question is asked in block 670 whether the user wants to resize the image again without preserving the aspect ratio of the original digital image to fit the receiver dimensions, or the user wants to crop the resized image 340? If answer to block 670 is RESIZE, the resized image 340 is resized again in block 680 so that the width and the length of the final image are both equal to those of the receiver 80. If answer to block 670 is CROP, the resized image 340 is cropped to appropriate length in block 690 so that the width and the length of the final image both equal those of the receiver 80. A borderless image is subsequently printed in block 800.

The printing operation in block 800 is now described. In each of situations discussed above, the start positions of the printed image are calculated according to the locations of the lead and side edges of the receiver 80. For borderless printing, the first print line is printed at the lead edge of the receiver 80 (FIGS. 3*a–c*) by the print bar 31 across the width of the receiver 80. During printing, the computer 20 controls the control electronics 25 to operate the platen transport mechanism 110 to move the platen 90. The receiver 80 is held down to the platen 90 by vacuum is moved under the print bar 3. The computer 20 sends electrical signal according to the image data to the print head drive electronics 30 one print line at a time. The print head control electronics sends appropriate electric signals to the print bar 31 to deliver ink to the receiver 80 in an image-wise fashion. An ink image corresponding to the input digital image is reproduced on receiver 80.

The invention has been described in detail with particular reference to certain preferred embodiments thereof, but it will be understood that variations and modifications can be effected within the spirit and scope of the invention.

| PARTS LIST | |
| --- | --- |
| 10 | ink jet printing apparatus |
| 20 | computer |
| 25 | control electronics |
| 30 | print head drive electronics |
| 31 | ink jet print bar |
| 40 | ink reservoir |
| 41 | ink reservoir |
| 42 | ink reservoir |
| 43 | ink reservoir |
| 70 | receiver transport mechanism |
| 80 | ink receiver |
| 90 | platen |
| 100 | vacuum pump |
| 105 | vacuum tube |
| 110 | platen transport device |
| 120 | receiver cutter |

| -continued | |
| --- | --- |
| PARTS LIST | |
| 130 | receiver roll |
| 150 | receiver detection unit |
| 160 | light source |
| 170 | optical sensor |
| 190 | holder |
| 200 | sliding rail |
| 210 | supports |
| 220 | belt |
| 230 | pulley mechanism |
| 240 | motor |
| 300 | lead edge |
| 310 | side edge |
| 320 | rear edge |
| 330 | resized image |
| 400 | load ink receiver |
| 410 | receiver lead edge |
| 420 | receiver side borders |
| 430 | ink receiver |
| 500 | borderless printing |
| 510 | input print orientation |
| 520 | input print size |
| 530 | input print image position |
| 540 | resize image |
| 550 | print start position |
| 600 | print orientation |
| 610 | resize image |
| 620 | image length |
| 630 | image length |
| 640 | cut or resize |
| 650 | resize image |
| 660 | cut receiver |
| 670 | crop or resize |
| 680 | resize image |
| 690 | crop image |
| 800 | printing image |

What is claimed is:

1. Ink jet printing apparatus for forming a borderless image on a receiver in response to a digital image file having a digital image and the desired size of the image to be formed, comprising:

a) ink jet print means for delivering ink to the receiver and disposed at an image transfer position;

b) means for moving the receiver along a path onto a platen past the ink jet print means at the image transfer position;

c) detector means disposed adjacent to the path for detecting the leading edge of the receiver prior to its moving to the image transfer position;

d) a receiver cutter for cutting the receiver to an appropriate size; and e) control means responsive to the digital image file for determining the appropriate size of the borderless image on the receiver and for actuating the ink jet print means to cause an ink image to be formed on the receiver as it moves past the image transfer position and for actuating the receiver cutter to cut the receiver so a borderless image is formed on the receiver.

2. The apparatus of claim 1 wherein the control means resizes the digital image so that it will be at the appropriate size to provide a borderless image.

3. The apparatus of claim 1 wherein the detector means includes means for detecting the position of at least one side edge of the receiver for providing a signal representative of the skew of the receiver relative to a nominal non-skewed position.

4. The apparatus of claim 1 wherein the ink jet print means is a print bar which is adapted to print a line at a time across the receiver and the receiver moving means causes the receiver to continuously move past the print bar which prints a line at a time across the receiver.

5. The apparatus of claim 1 wherein the detector means includes an optical sensor which is moveable across the full width of the receiver and adapted to produce signals corresponding to edges of the receiver.

6. Ink jet printing apparatus for forming a borderless image on a receiver in response to a digital image file having a digital image and the desired size of the image to be formed, comprising:

a) ink jet print means for delivering ink to the receiver and disposed at an image transfer position;

b) means for moving the receiver along a path onto a platen past the ink jet print means at the image transfer position;

c) detector means disposed adjacent to the path for detecting the leading edge of the receiver prior to its moving to the image transfer position and for determining at least one dimension of the receiver; and d) control means responsive to the digital image file and the dimension of the receiver for determining the appropriate size of the borderless image on the receiver and for actuating the ink jet print means to cause an ink image of the appropriate size to be formed on the receiver as it moves past the image transfer position so a borderless image is formed on the receiver.

7. The apparatus of claim 6 wherein the control means resizes the digital image so that it will be at the appropriate size to provide a borderless image.

8. The apparatus of claim 6 wherein the detector means includes means for detecting the position of at least one side edge of the receiver for providing a signal representative of the skew of the receiver relative to a nominal non-skewed position.

9. The apparatus of claim 6 wherein the ink jet print means is a print bar which is adapted to print a line at a time across the full width of the receiver and the receiver moving means causes the receiver to continuously move past the print bar which prints a line at a time across the receiver.

10. The apparatus of claim 6 wherein the detector means includes an optical sensor which is moveable across the receiver and adapted to produce signals corresponding to edges of the receiver.

11. Ink jet printing apparatus for forming a borderless image on a receiver in response to a digital image file having a digital image and the desired size of the image to be formed, comprising:

a) ink jet print means for delivering ink to the receiver and disposed at an image transfer position;

b) means for moving the receiver along a path onto a platen past the ink jet print means at the image transfer position such that the ink jet print means is spaced a predetermined distance from the receiver to the image transfer position;

c) a receiver cutter for cutting the receiver to an appropriate size;

d) means for applying a vacuum to the receiver on the platen to maintain the predetermined distance between the ink jet print means and the receiver at the image transfer position;

e) detector means disposed adjacent to the path for detecting the leading edge of the receiver prior to its moving to the image transfer position and for determining at least one dimension of the receiver; and f) control means responsive to the digital image file and the dimension of the receiver for determining the appropriate size of the borderless image on the receiver and for actuating the ink jet print means to cause an ink image of the appropriate size to be formed on the receiver as it moves past the image transfer position and for actuating the receiver cutter to cut the receiver so a borderless image is formed on the receiver.

12. The apparatus of claim 11 wherein the control means resizes the digital image so that it will be at the appropriate size to provide a borderless image.

13. The apparatus of claim 11 wherein the detector means includes means for detecting the position of at least one side edge of the receiver for providing a signal representative of the skew of the receiver relative to a nominal non-skewed position.

14. The apparatus of claim 11 wherein the ink jet print means is a print bar which is adapted to print a line at a time across the receiver and the receiver moving means causes the receiver to continuously move past the print bar which prints a line at a time across the receiver.

15. The apparatus of claim 11 wherein the detector means includes an optical sensor which is moveable across the full width of the receiver and adapted to produce signals corresponding to edges of the receiver.

* * * * *